(12) United States Patent
Kamei et al.

(10) Patent No.: US 11,878,587 B2
(45) Date of Patent: Jan. 23, 2024

(54) DISPLAY DEVICE

(71) Applicant: MITSUBISHI JIDOSHA KOGYO KABUSHIKI KAISHA, Tokyo (JP)

(72) Inventors: Yuichi Kamei, Tokyo (JP); Eiji Yamashita, Tokyo (JP); Toyohito Hirano, Tokyo (JP); Reoto Ueda, Tokyo (JP); Jinichi Ohta, Tokyo (JP); Takayuki Okuji, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 220 days.

(21) Appl. No.: 17/598,698

(22) PCT Filed: Jan. 14, 2020

(86) PCT No.: PCT/JP2020/000791
§ 371 (c)(1),
(2) Date: Sep. 27, 2021

(87) PCT Pub. No.: WO2020/195019
PCT Pub. Date: Oct. 1, 2020

(65) Prior Publication Data
US 2022/0153136 A1  May 19, 2022

(30) Foreign Application Priority Data
Mar. 25, 2019  (JP) ................. 2019-056462

(51) Int. Cl.
*B60K 35/00* (2006.01)
*G09G 3/20* (2006.01)
(Continued)

(52) U.S. Cl.
CPC ............ *B60K 35/00* (2013.01); *G06F 3/0484* (2013.01); *G06T 19/00* (2013.01); *G09G 3/2003* (2013.01);
(Continued)

(58) Field of Classification Search
None
See application file for complete search history.

(56) References Cited

U.S. PATENT DOCUMENTS

2009/0125173 A1\* 5/2009 Komatsu ................ B60L 50/16
701/99
2009/0322503 A1  12/2009 Suzuki et al.
(Continued)

FOREIGN PATENT DOCUMENTS

CN  108944402 A  12/2018
JP  4155321 B2  9/2008
(Continued)

OTHER PUBLICATIONS

Indonesian Office Action dated Sep. 2, 2022 issued in corresponding Indonesian Patent Application No. P00202107260.
(Continued)

*Primary Examiner* — Jwalant Amin
(74) *Attorney, Agent, or Firm* — Birch, Stewart, Kolasch & Birch, LLP

(57) ABSTRACT

A display device 30 displays information of variables that reflect a state of a vehicle 10. The display device 10 includes: a first display region 31 that displays a scale of a first variable; a second display region 32 that is provided to be aligned with the first display region 31 and displays a scale of a second variable; a first pointing portion 42 that points, in the first display region 31, the first variable in accordance with the state of the vehicle 10; a first strip-shaped image 43 that is displayed between a pointed position of the first pointing portion 42 and a start point S1 of the first display region 31; a second pointing portion 52 that points, in the second display region 32, the second variable in accordance with the state of the vehicle 10; and a second strip-shaped image 53 that is displayed between a pointed position of the second pointing portion 52 and a start point S2 of the second display region.

8 Claims, 5 Drawing Sheets

(51) Int. Cl.
*G06T 19/00* (2011.01)
*G06F 3/0484* (2022.01)
*B60K 6/22* (2007.10)

(52) U.S. Cl.
CPC .......... *B60K 6/22* (2013.01); *B60K 2370/152* (2019.05); *B60K 2370/167* (2019.05); *B60K 2370/172* (2019.05); *B60K 2370/695* (2019.05); *B60Y 2200/92* (2013.01); *B60Y 2400/92* (2013.01); *G09G 2320/0686* (2013.01); *G09G 2380/10* (2013.01)

(56) References Cited

U.S. PATENT DOCUMENTS

| | | | |
|---|---|---|---|
| 2016/0176413 A1 | 6/2016 | Oguri | |
| 2017/0276938 A1* | 9/2017 | Nakashima | G08G 1/166 |
| 2017/0323164 A1* | 11/2017 | Kishi | G02B 27/0179 |
| 2018/0118028 A1* | 5/2018 | Ueo | B60K 35/00 |
| 2018/0334034 A1 | 11/2018 | Okuji et al. | |
| 2018/0335325 A1 | 11/2018 | Okuji et al. | |

FOREIGN PATENT DOCUMENTS

| | | | |
|---|---|---|---|
| JP | 2009-69040 A | | 4/2009 |
| JP | 2009069040 A | * | 4/2009 |
| JP | 2016-117300 A | | 6/2016 |
| JP | 2018-193050 A | | 12/2018 |
| JP | 2018-197691 A | | 12/2018 |

OTHER PUBLICATIONS

International Preliminary Report on Patentability (PCT/ISA/237) dated Sep. 28, 2021 in PCT/JP2020/000791.
Office Action dated Mar. 30, 2022 issued in corresponding Japanese Application No. 2021-508105 with English Translation.
Chinese Office Action and Search Report for Chinese Application No. 202080024244.7, dated Apr. 28, 2023, with an English translation.

* cited by examiner

DISPLAY DEVICE

TECHNICAL FIELD

The present invention relates to a display device that displays information reflecting a state of a vehicle.

BACKGROUND ART

An engine vehicle using an engine as drive power source for traveling, a hybrid vehicle using an engine and a motor as drive power sources for traveling, or the like is provided with a display device that displays information reflecting states of the vehicle.

PRIOR ART DOCUMENT

Patent Document

Patent Document 1: Japanese Patent No. 4155321

SUMMARY OF THE INVENTION

Problems to be Solved by the Invention

Problems of a display device in hybrid vehicle, as an example, will be described. A hybrid vehicle has, as traveling modes, an electric vehicle (EV) mode in which the hybrid vehicle drives drive wheels using only a motor and a hybrid vehicle (HV) mode in which the hybrid vehicle drives the drive wheels using the motor and an engine.

The hybrid vehicle travels in the EV mode at the time of starting, then activates the engine in accordance with conditions of the vehicle, and travels in the HV mode. Such a hybrid vehicle is adapted such that the display device displays which of the EV mode and the HV mode the hybrid vehicle is traveling in for a driver (see Patent Document 1, for example).

For example, Patent Document 1 describes a display device including a first display portion that displays a state quantity that changes in accordance with an output request of a driver and a second display portion that displays a dividing line of the state quantity at which the traveling modes are switched.

However, since the aforementioned dividing line changes in accordance with conditions of the vehicle and may move regardless of a drive's driving operation, this may lead not only difficulty for the driver in determining a traveling state of the hybrid vehicle but also activation of the engine at an unexpected timing. As described above, a display device that displays, in an easily understandable way, information reflecting a state of a vehicle for a hybrid vehicle has been desired.

Also, a plurality of items of information reflecting a state of a vehicle are displayed in a display device in an engine vehicle as well, and it has been desired to display such information in an easily understandable way.

The present invention was made in view of the above problems, and an object thereof is to provide a display device that displays information reflecting a state of a vehicle in an easily understandable way.

Means for Solving the Problems

In order to achieve the above object, the present invention is directed to a display device that displays information of variables that reflect a state of a vehicle, the display device including: a first display region that displays a scale of a first variable; a second display region that is provided to be aligned with the first display region and displays a scale of a second variable; a first pointing portion that points, in the first display region, the first variable in accordance with the state of the vehicle; a first strip-shaped image that is displayed between a pointed position of the first pointing portion and a start point of the first display region; a second pointing portion that points, in the second display region, the second variable in accordance with the state of the vehicle; and a second strip-shaped image that is displayed between a pointed position of the second pointing portion and a start point of the second display region.

In the display device according to the present invention to achieve the above object, the first variable may indicate a first output of the vehicle in a first mode in which priority is placed on traveling using an electric motor with an internal combustion engine stopped, and the second variable indicates a second output of the vehicle in a second mode in which the vehicle travels with the internal combustion engine operated.

In the display device according to the present invention to achieve the above object, the first variable may indicate a third output of the vehicle in the second mode, and the third output is different from the second output.

In the display device according to the present invention to achieve the above object, the first strip-shaped image and the second strip-shaped image may be displayed in different display forms.

In the display device according to the present invention to achieve the above object, the first strip-shaped image and the second strip-shaped image may have different thicknesses.

In the display device according to the present invention to achieve the above object, the thickness of the first strip-shaped image may be thicker than the thickness of the second strip-shaped image.

The display device according to the present invention to achieve the above object may further includes: a third display region that is provided inside the first display region at a portion close to the second display region and indicates a range of the output in which there is a high probability that the internal combustion engine is activated.

In the display device according to the present invention to achieve the above object, scale marks provided in the third display region and other scale marks provided in the first display region may have different color combinations.

In the display device according to the present invention to achieve the above object, scale mark numbers may be represented in the second display region, and the second strip-shaped image may be displayed at a position at which the second strip-shaped image does not overlap the scale mark numbers.

The display device according to the present invention to achieve the above object may further includes: a fourth display region that is provided to be aligned with the first display region on a side different from a side of the second display region and indicates a charged power in a battery of the vehicle at the time of regeneration; a fourth pointing portion that changes in accordance with the charged power in the fourth display region; and a fourth strip-shaped image that is displayed between a pointed position of the fourth pointing portion and a start point of the fourth display region, in which the first strip-shaped image and the fourth strip-shaped image are displayed in different display forms.

In the display device according to the present invention to achieve the above object, the first strip-shaped image and the fourth strip-shaped image may have different color combinations.

In the display device according to the present invention to achieve the above object, a region including the first display region and the second display region may have a semicircular shape, and the start point of the first display region is at a 9 o'clock position, and an end point of the second display region is at a 3 o'clock position.

Advantageous Effects of the Invention

According to the present invention, it is possible to provide a display device that displays information reflecting a state of a vehicle in an easily understandable way.

MODE FOR CARRYING OUT THE INVENTION

Hereinafter, embodiments of a display device according to the present invention will be described with reference to FIGS. 1 to 5. Although a hybrid vehicle will be described here as an example, a plug-in hybrid vehicle with a drive battery that can be charged by an external commercial power source or an engine vehicle that includes only an engine (internal combustion engine) may also be employed.

First Embodiment

A configuration of the display device according to the present embodiment will be described with reference to FIGS. 1 to 5.

Figure 1:
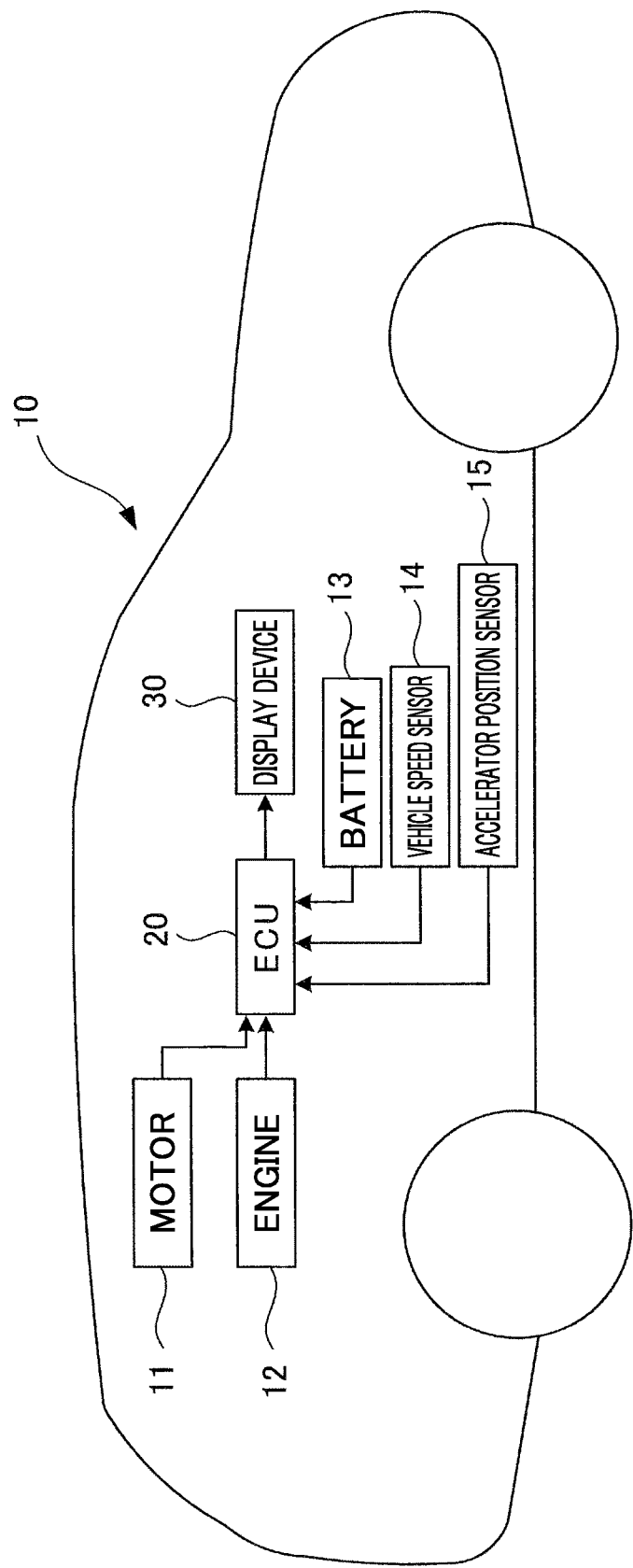
FIG. 1 is a block diagram for explaining a hybrid vehicle.

As illustrated in FIG. 1, a hybrid vehicle 10 includes, as drive power sources for traveling, a motor 11 (electric motor) and an engine 12 (internal combustion engine). The motor 11 may be configured to drive front wheels or rear wheels, or a configuration in which a plurality of motors 11 are provided such that each of the motors 11 drives the front wheels or the rear wheels may also be employed. Also, the engine 12 may be configured to drive the front wheels or the rear wheels or may be configured to drive the front wheels and the rear wheels. Moreover, the hybrid vehicle 10 may include a generator (not illustrated) that is driven by the engine 12 to generate power.

The hybrid vehicle 10 has, as traveling modes, a first mode (electric motor output mode) in which priority is placed on traveling (driving of drive wheels) using the motor 11 with the engine 12 stopped (higher priority is placed on traveling with the motor 11 than on traveling with the engine 12) and a second mode (internal combustion engine output mode) in which the hybrid vehicle 10 travels (drives the drive wheels) using the motor 11 and the engine 12, for example with the engine 12 operated.

Also, the hybrid vehicle 10 has an electronics control unit (ECU) 20 that is a control unit. The ECU 20 includes a central processing unit (CPU), a random access memory (RAM), a read only memory (ROM), an input/output circuit, and the like, is electrically connected to the motor 11 and the engine 12, and is also electrically connected to a drive battery 13 that supplies electric power to the motor 11, a vehicle speed sensor 14 that detects a vehicle speed, and an accelerator position sensor 15 that detects an acceleration position.

Therefore, signal values (such as a motor rotation frequency) from the motor 11 and signal values (such as ON/OFF and an engine rotation frequency) from the engine 12 are input to the ECU 20, and further, signal values (such as a state of charge (SOC) and a battery output) from the battery 13, signal values from the vehicle speed sensor 14 and the accelerator position sensor 15, and the like are also input thereto.

The hybrid vehicle 10 further includes a display device 30 that displays information of variables that reflect a state of the vehicle. The variables are outputs (traveling outputs) related to traveling of the hybrid vehicle 10 in the present embodiment, and the display device 30 is electrically connected to the ECU 20. The traveling outputs of the hybrid vehicle 10 are obtained through arithmetic processing performed by the ECU 20 on the basis of the aforementioned signal values, and the arithmetic processing values (traveling outputs) obtained in the arithmetic processing are output to the display device 30. As the display device 30, a digital meter including a liquid crystal panel and the like is suitably used.

As illustrated in FIGS. 2 to 5, the display device 30 includes a circular-shaped gauge panel 35 in which a first display region 31 (including a third display region 33), a second display region 32, and a fourth display region 34 are disposed. In the following description, one or both of clock times on the assumption that the uppermost position (a start point S2, which will be described later) of the gauge panel 35 is defined as a 0 (=12) o'clock position and angles on the assumption that the uppermost position of the gauge panel 35 is defined as a position of 0° (=360°) are used as expressions of azimuth orientations on the gauge panel 35.

The first display region 31 is a region in which a scale of a first variable in accordance with a state of the hybrid vehicle 10 is displayed. In the present embodiment, the first variable is a traveling output when the hybrid vehicle 10 travels using the motor 11 with the engine 12 stopped, that is, a traveling output in the first mode (first output). The first display region 31 is disposed in a fan shape or an arc shape between a position of 270° (9 o'clock) as a start point S1 and a position of 360° (12 o'clock) in an outer peripheral portion on the gauge panel 35. A first display portion 41 including a first pointing portion 42 and a first strip-shaped image 43 that change in accordance with the traveling output in the first mode is displayed in the first display region 31.

The first pointing portion 42 is an image of a pointer that points a value corresponding to the traveling output in the first mode in the first display region 31 (between the position of 9 o'clock and the position of 12 o'clock). Specifically, the first pointing portion 42 has a pointing direction (a rotation angle from the direction of 9 o'clock (270°) relative to the substantial center of the gauge panel 35 defined as a reference point) changing in accordance with the traveling output in the first mode and points, with the pointing direction (a direction relative to the substantial center of the gauge panel 35 defined as the reference point), the value corresponding to the traveling output in the first mode.

The first strip-shaped image 43 is an image of a strip-shaped figure pointing the value corresponding to the traveling output in the first mode inside the first display region 31 (between the position of 9 o'clock and the position of 12 o'clock). Specifically, the first strip-shaped image 43 has a length of the strip-shaped figure in a circumferential direction (the length in a clockwise direction from the position of 9 o'clock) changing in accordance with the traveling output in the first mode and points, with the length of the strip-shaped figure in the circumferential direction (the position of a distal end portion of the strip-shaped figure starting from the position of 9 o'clock), the value corresponding to the traveling output in the first mode. Here, the first strip-shaped image 43 is configured such that the number of segments in the strop-shaped figure with a specific shape increases or decreases and the length of only the strip-shaped figure of a segment that overlaps the first pointing portion 42 in the circumferential direction increases or decreases with an increase or a decrease in traveling output. Also, the first strip-shaped image 43 is displayed further inward than the position of first scale marks 44 in the first display region 31 on the gauge panel 35.

In other words, the first strip-shaped image 43 is displayed between the pointed position of the first pointing portion 42 and the start point S1 (the position of 9 o'clock) of the first display region 31, and the position of the distal end portion of the strip-shaped figure conforms to the pointed position of the first pointing portion 42 and points the value corresponding to the traveling output in the first mode.

It is possible to more clearly notify a driver of a state of traveling at the time of traveling without activating the engine 12 in the first mode and to improve visibility by configuring the first pointing portion 42 as the image of the pointer and configuring the first strip-shaped image 43 as the image of the strip-shaped figure.

Also, the first strip-shaped image 43 is displayed to be thicker than a second strip-shaped image 53, which will be described later, and in this manner, the driver more easily visually recognizes that the hybrid vehicle 10 is traveling without activating the engine 12 in the first mode, and it is possible to notify the driver of the fact that the hybrid vehicle 10 is traveling in an environment friendly manner.

As the traveling output in the first mode (first output) that serves as the first variable, it is possible to use, for example, an output parameter such as an output of the motor 11 (motor output), a rotation frequency of the motor 11, a power (work rate) caused by an operation of the motor 11, or a battery output of the battery 13.

Also, the third display region 33 is provided inside the first display region 31. The third display region 33 is provided inside the first display region 31 at a location close (or adjacent) to the second display region 32. Also, third scale marks 45 in the third display region 33 and the first scale marks 44 in the first display region 31 have different color combinations (the third scale marks 45 are illustrated as outlined to express the differences in color combinations in FIGS. 2 to 5). The position of a start point scale mark 45a on the left end side indicating a start point of the third display region 33 indicates a position (the value corresponding to the traveling output) of a limit for placing priority on traveling using the motor 11 with the engine 12 stopped in the first mode.

Here, the state in which priority is placed on the traveling using the motor 11 with the engine 12 stopped is a state in which all of a plurality of conditions for activating the engine 12 have not been established. On the other hand, a state in which there is a (high) probability that the engine 12 is activated is a state immediately before at least one of a plurality of conditions for activating the engine 12 is established. The third display region 33 is for indicating a boundary between these states, that is, a limit region in which priority is placed on the traveling using the motor 11 with the engine 12 stopped, with a predetermined width. There is also a case in which the engine 12 is activated at a position in a counterclockwise direction (within a range of a region except for the third display region 33 in the first display region 31) relative to the start point scale mark 45a of the third display region 33 defined as a reference in accordance with conditions.

In other words, the third display region 33 included in the first display region 31 is an engine activation impending region indicating the traveling output of the motor 11 when at least one of the plurality of conditions for activating the engine 12 is about to be established, and there is an increasing probability that the engine 12 is activated, that is, there is a (high) probability that shifting from the first mode to the second mode occurs, for example. The third display region 33 is disposed in a fan shape or an arc shape inside the first display region 31 between the position of 345° and the position of 360° (0 o'clock) (a location close to the second display region 32).

Therefore, the first pointing portion 42 and the first strip-shaped image 43 shift within the range of the region except for the third display region 33 in the first display region 31 in a case in which there is no (or low) probability that the engine 12 is activated, while the first pointing portion 42 and the first strip-shaped image 43 shift within the range of the third display region 33 in the first display region 31 in a case in which there is a (high) probability that the engine 12 is activated, that is, immediately before the engine 12 is activated, in the first mode.

It is possible to indicate, with the first pointing portion 42 and the first strip-shaped image 43, that there is a probability that the engine 12 is activated, by providing such a third display region 33 with a predetermined width inside the first display region 31, and it is thus possible for the driver to know that a state in which the engine 12 is likely to be activated has been achieved. In addition, the driver can easily know that the state in which the engine 12 is likely to be activated has been achieved by causing the third scale marks 45 to have a color combination different from a color combination of the first scale marks 44. Therefore, the driver can easily know the traveling state of the hybrid vehicle 10 and the operating state of the motor 11, can accurately recognize the traveling output, and can easily realize intended driving.

Also, the first display region 31 is also a region indicating an output of the motor 11 (motor output), a rotation frequency of the motor 11, or a power (work rate) caused by an operation of the motor 11 during traveling with the engine 12 operated, that is, as a third output in the second mode.

Moreover, the first display region 31 may be a region indicating a parameter such as a battery output of the battery 13 (an assist power of the motor 11) during traveling with the engine 12 operated, that is, as a third output in the second mode.

Also, the traveling output (first output) in the first mode and the motor output (third output) in the second mode described above may be configured to be selectable by the driver. For example, one output parameter may be selected from among the aforementioned output parameters as each of the traveling output in the first mode and the motor output in the second mode, by providing a selection switch (not illustrated) in the display device 30 and operating the selection switch. Here, it is possible to simplify control in a case in which the first pointing portion 42 and the first strip-shaped image 43 are adapted to change in accordance with the same output parameter both in the first mode and the second mode.

Also, in a case in which the first display region 31 is adapted to indicate an output of the motor 11 or an output of the battery 13 in the second mode and the first pointing portion 42 and the first strip-shaped image 43 are adapted to change in accordance with the output of the motor 11 or the output of the battery 13 in the second mode, the driver can obtain information of an assist output of the motor 11 as appropriate information in accordance with the traveling state of the hybrid vehicle 10, and more specifically, the driver can check excessive outputs of the motor 11 and the battery 13.

The second display region 32 is a region that displays a scale of a second variable in accordance with a state of the hybrid vehicle 10. In the present embodiment, the second variable is a traveling output (second output) during traveling with the engine 12 operated, that is, an output of the engine 12 (engine output) in the second mode. The second display region 32 is disposed to be aligned with the first display region 31 in an outer peripheral portion on the gauge panel 35 and is disposed in a fan shape or an arc shape between the position of 0° (0 o'clock) that is the start point S2 and the position of 90° (3 o'clock) that is an end point S3. A second display portion 51 including a second pointing portion 52 and a second strip-shaped image 53 that change in accordance with the engine output in the second mode is displayed in the second display region 32.

The second pointing portion 52 is an image of a pointer that points, inside the second display region 32 (between the position of 0 o'clock and the position of 3 o'clock), a value corresponding to the engine output. Specifically, the second pointing portion 52 has a pointing direction (a rotation angle from the direction of 0 o'clock (0°) relative to the substantial center of the gauge panel 35 defined as a reference point) changing in accordance with the engine output in the second mode and points, with the pointing direction (the direction relative to the substantial center of the gauge panel 35 defined as the reference point), the value corresponding to the engine output in the second mode.

The second strip-shaped image 53 is an image of a strip-shaped figure pointing the value corresponding to the engine output inside the second display region 32 (between the position of 0 o'clock and the position of 3 o'clock). Specifically, the second strip-shaped image 53 has a length of the strip-shaped figure in the circumferential direction (the length in the clockwise direction from the position of 0 o'clock) changing in accordance with the engine output in the second mode and points, with the length of the strip-shaped figure in the circumferential direction (the position of the distal end portion of the strip-shaped figure starting from the position of 0 o'clock), the value corresponding to the engine output in the second mode. Here, the second strip-shaped image 53 is configured such that the length of the strip-shaped figure with an integral shape in the circumferential direction increases or decreases with an increase or decrease in traveling output.

In other words, the second strip-shaped image 53 is displayed between a pointed position of the second pointing portion 52 and the starting point S2 (the position of 0 o'clock) of the second display region 32, and the position of the distal end portion of the strip-shaped figure conforms to the pointed position of the second pointing portion 52 and also points the value corresponding to the engine output in the second mode.

Also, the second strip-shaped image 53 is displayed in a superimposed manner on the second scale marks 54 at the position of the second scale marks 54 in the second display region 32 on the gauge panel 35 and is displayed at a position at which the second strip-shaped image 53 does not overlap the scale mark numbers (the scale mark numbers represented as 0, 2, 4, and 6) represented in the second display region 32. Also, the second strip-shaped image 53 and the first strip-shaped image 43 have the same color combination.

In this manner, it is possible to more clearly notify the driver of the traveling in the second mode through dynamic motions of the pointer and the strip-shaped figure when the traveling in the second mode starts, by configuring the second pointing portion 52 as the image of the pointer and configuring the second strip-shaped image 53 as the image of the strip-shaped figure. Also, the second strip-shaped image 53 is displayed at the position at which the second strip-shaped image 53 does not overlap the scale mark numbers, such that the driver can easily recognize how large the engine output in the second mode is.

Also, the second strip-shaped image 53 is displayed to be thinner than the aforementioned first strip-shaped image 43, and in this manner, it is possible to provide the driver a sharp image during the traveling in the second mode and to allow the driver to have an impression in accordance with the traveling state.

In other words, the second strip-shaped image 53 in the second display region 32 and the first strip-shaped image 43 in the first display region 31 have different thicknesses here, and it may be assumed that the first strip-shaped image 43 and the second strip-shaped image 53 are displayed in mutually different display forms including shapes such as thicknesses and the like including color combinations as described above.

Although the second variable (second output) is assumed to be an engine output in the present invention, the second variable is not limited thereto and may be a parameter such as a rotation frequency of the engine 12 or a power (work rate) caused by an operation of the engine 12, for example.

The aforementioned engine output in the second mode can also be configured to be selectable by the driver. For example, one parameter may be selected from among the aforementioned parameters as the second variable in the second mode, by providing a selection switch (not illustrated) in the display device 30 and operating the selection switch.

Here, in a case in which the second pointing portion 52 and the second strip-shaped image 53 are displayed for the rotation frequency of the engine 12, and even in a case in which the engine 12 is operated for warming a catalyst, for example, the driver can easily recognize such an operation (for an application other than traveling) of the engine 12.

The fourth display region 34 is a region indicating a charged power to the battery 13 (a generated power output of the motor 11) at the time of regeneration, is disposed to be aligned with the first display region 31 on a side different from the side of the second display region 32 at an outer peripheral portion on the gauge panel 35, and is disposed in a fan shape or an arc shape between the position of 270° (9 o'clock) that is the start point S1 and the position of 210° (7 o'clock). A fourth display portion 61 including a fourth pointing portion 62 and a fourth strip-shaped image 63 that change in accordance with the aforementioned charged power is displayed in the fourth display region 34.

The fourth pointing portion 62 is an image of a pointer pointing a value corresponding to the charged power inside the fourth display region 34 (between the position of 9 o'clock and the position of 7 o'clock). Specifically, the fourth pointing portion 62 has a pointing direction (a rotation angle from the direction of 9 o'clock (270°) relative to the substantial center of the gauge panel 35 defined as a reference point) changing in accordance with the charged power and points, with the pointing direction (the direction relative to the substantial center of the gauge panel 35 defined as the reference point), the value corresponding to the charged power.

The fourth strip-shaped image 63 is an image of a strip-shaped figure pointing the value corresponding to the charged power inside the fourth display region 34 (between the position of 9 o'clock and the position of 7 o'clock). Specifically, the fourth strip-shaped image 63 has a length of the strip-shaped figure in the circumferential direction (the length in the counterclockwise direction from the position of 9 o'clock) changing in accordance with the charged power and points, with the length of the strip-shaped figure in the circumferential direction (the position of the distal end portion of the strip-shaped figure starting from the position of 9 o'clock), the value corresponding to the charged power. Here, the fourth strip-shaped image 63 is configured such that the number of segments in the strip-shaped figure with a specific shape increases or decreases and the length of only the strip-shaped figure of a segment that overlaps the fourth pointing portion 62 in the circumferential direction increases or decreases with an increase or a decrease in charged power. Also, the fourth strip-shaped image 63 is displayed on further inward than the position of the fourth scale marks 64 in the fourth display region 34 on the gauge panel 35, is displayed in a display form different from that of the first strip-shaped image 43, and has a different color combination, for example.

In other words, the fourth strip-shaped image 63 is displayed between the pointed position of the fourth pointing portion 62 and the start point S1 (the position of 9 o'clock) of the fourth display region 34, and the position of the distal end portion of the strip-shaped figure conforms to the pointed position of the fourth pointing portion 62, and points the value corresponding to the charged power to the battery 13 at the time of regeneration.

In this manner, it is possible to more clearly notify the driver of the charged state of the battery 13 at the time of regeneration through motions of the pointer and the strip-shaped figure when the battery 13 is charged at the time of the regeneration, by configuring the fourth pointing portion 62 as the image of the point and configuring the fourth strip-shaped image 63 as the image of the strip-shaped figure. Also, it is possible to more clearly notify the driver of the fact that the battery 13 is now in a charged state, by employing a display form (a color combination, for example) different from the display form of the first strip-shaped image 43.

Also, each of the aforementioned first display region 31 (including the third display region 33), the second display region 32, and the fourth display region 34 is disposed in a fan shape or an arc shape within a predetermined range and is independently disposed within the predetermined range with a similar fan shape or arc shape, and the aforementioned first display region 31 (including the third display region 33), the second display region 32, and the fourth display region 34 are disposed in a fan shape or an arc shape as a whole as well. In addition, the first display region 31 (including the third display region 33) and the second display region 32 have fan shapes or arc shapes that continue with the position of 0 o'clock (=12 o'clock) defined as a boundary, and these two regions have a semi-circular shape from the position of 9 o'clock to the position of 3 o'clock.

The display region including the first display region 31 and the second display region 32 is provided to have a semi-circular shape, and the first display region 31 and the second display region 32 are provided continuously in a fan shape or an arc shape with the start point S2, which is the uppermost position of the display region (gauge panel 35), defined as a boundary, such that the driver can intuitively recognize the display information of the display device 30 (the operating state of the hybrid vehicle 10).

Although no scale mark numbers are represented in the first display region 31 (including the third display region 33) and the fourth display region 34 while the scale mark numbers are represented in the second display region 32 on the aforementioned gauge panel 35, scale mark numbers may be represented in the first display region 31 (including the third display region 33) and the fourth display region 34 while no scale mark numbers may be represented in the second display region 32.

Although the second strip-shaped image 53 is an image of a thin strip-shaped figure disposed at the position at which the second strip-shaped image 53 overlaps the second scale marks 54 on the aforementioned gauge panel 35, the second strip-shaped image 53 may be disposed at another position as long as the second strip-shaped image 53 does not overlap the scale mark numbers represented in the second display region 32. For example, the second strip-shaped image 53 may be displayed as an image of a strip-shaped figure that is thinner than the first strip-shaped image 43 and the fourth strip-shaped image 63 on a side further inward than the scale mark numbers represented in the second display region 32.

Also, the first strip-shaped image 43 and the second strip-shaped image 53 have the same color combinations while the fourth strip-shaped image 63 has a color combination that is different from the color combination of the first strip-shaped image 43 and the second strip-shaped image 53 on the aforementioned gauge panel 35, each of the first strip-shaped image 43, the second strip-shaped image 53, and the fourth strip-shaped image 63 may have different color combination.

Although the first strip-shaped image 43 and the fourth strip-shaped image 63 include a plurality of strip-shaped figures while the second strip-shaped image 53 has an integral strip-shaped figure on the aforementioned gauge panel 35, the first strip-shaped image 43 and the fourth strip-shaped image 63 may be integral strip-shaped figures while the second strip-shaped image 53 may include a plurality of strip-shaped figures, a configuration in which all the first strip-shaped image 43, the second strip-shaped image 53, and the fourth strip-shaped image 63 include a plurality of strip-shaped figures may be employed, or a configuration in which all the first strip-shaped image 43, the second strip-shaped image 53, and the fourth strip-shaped image 63 include integral strip-shaped figures may also be employed.

Although the first scale marks 44 in the first display region 31 and the third scale marks 45 in the third display region 33 have different color combinations on the aforementioned gauge panel 35, the shape of the third scale marks 45 may be a thick line or a shape such as a triangular shape or a diamond shape, for example. In this manner, it may be assumed that the first scale marks 44 and the third scale marks 45 are displayed in mutually different display forms such as color combinations or shapes.

Although the first pointing portion 42, the second pointing portion 52, and the fourth pointing portion 62 are the images of the pointers on the aforementioned gauge panel 35, the first pointing portion 42, the second pointing portion 52, and the fourth pointing portion 62 are not limited to the images of the pointers and may be displayed with images such as dots, for example.

Next, operations of the display device according to the present embodiment will be described with reference to FIGS. 1 to 5.

If the driver causes the hybrid vehicle 10 to start, then the hybrid vehicle 10 starts to travel in the first mode.

Figure 2:
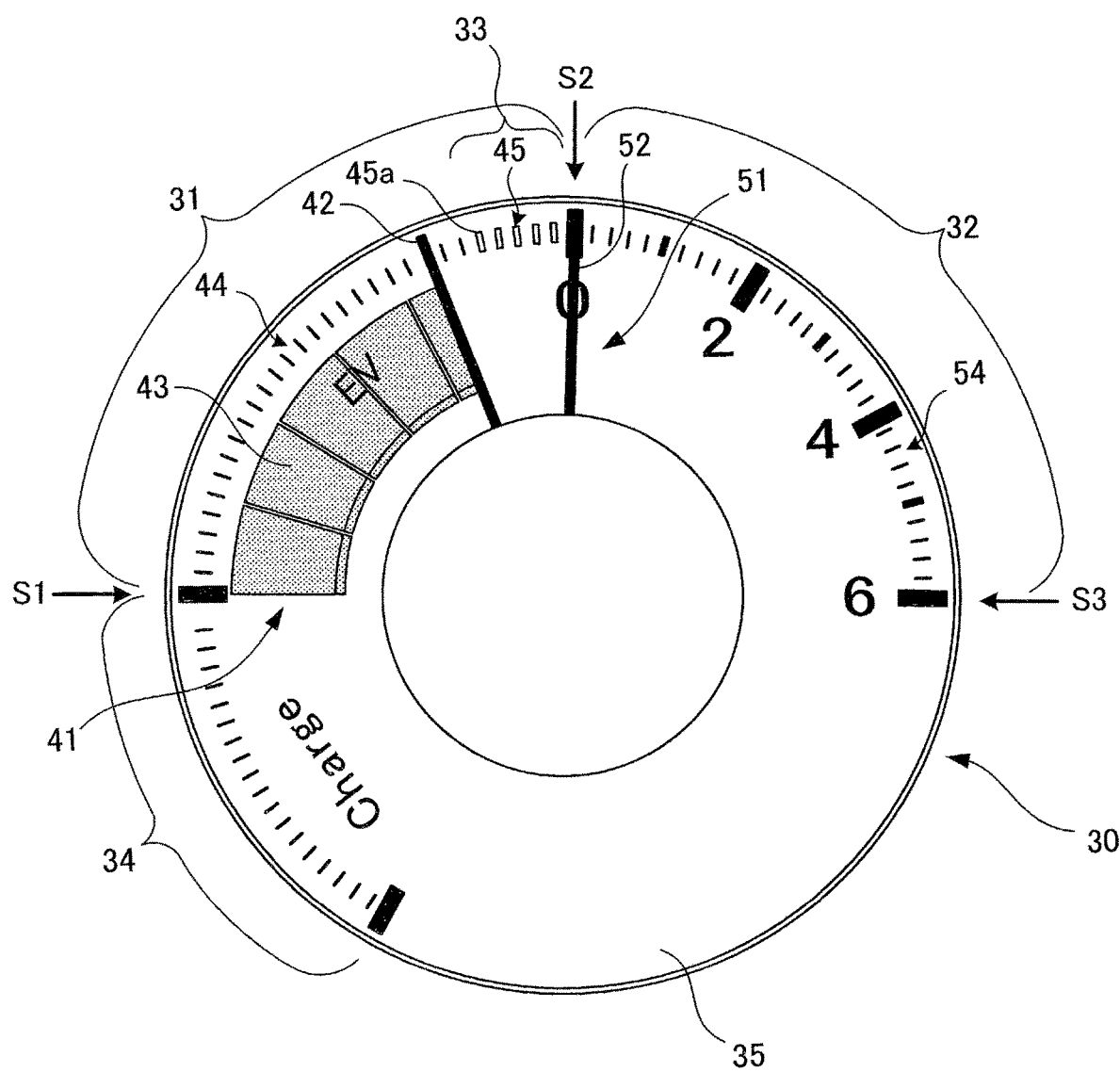
FIG. 2 is a diagram illustrating an example of an embodiment of a display device according to the present invention and is a diagram illustrating display in a first mode.
Figure 3:
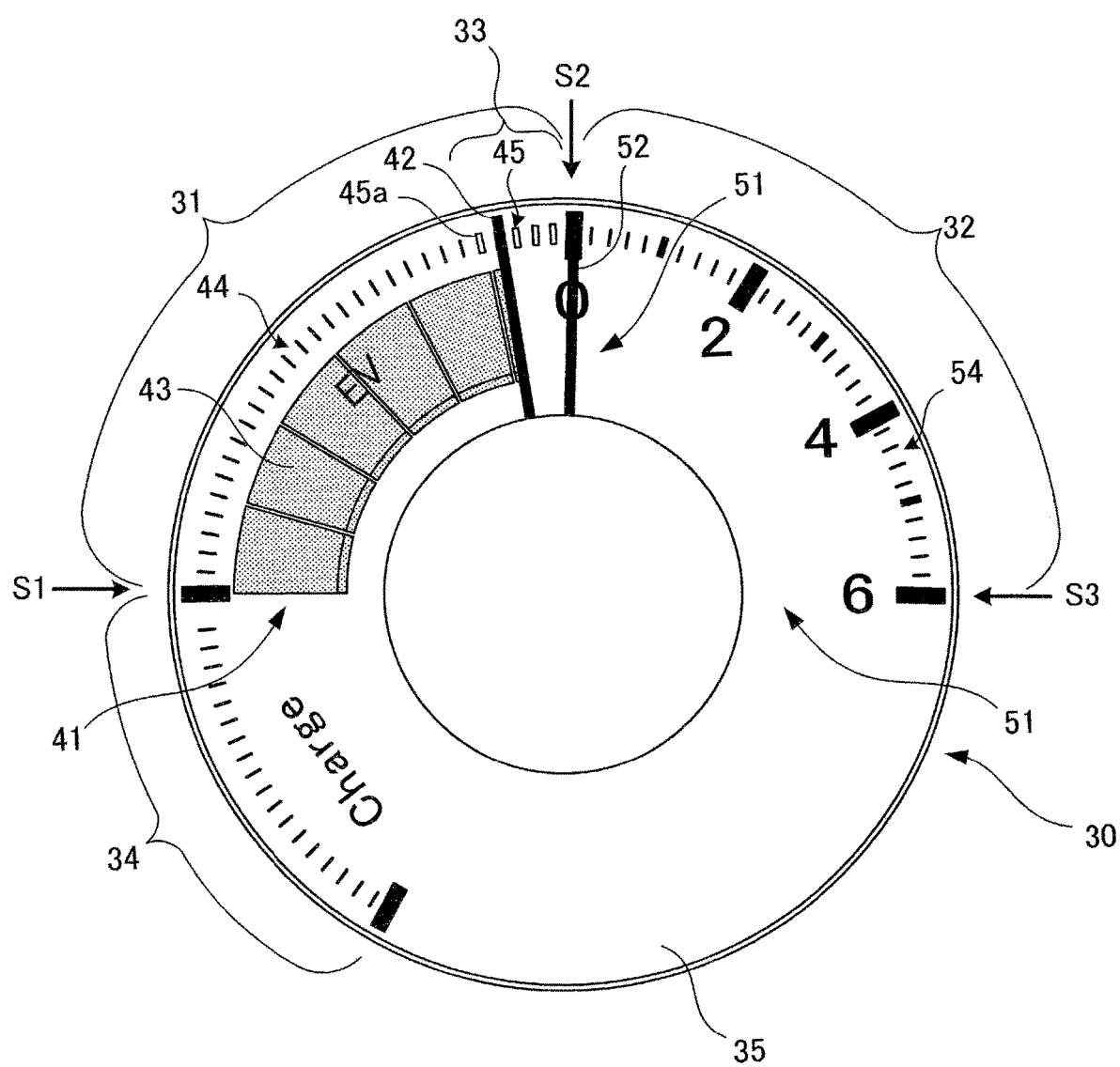
FIG. 3 is a diagram illustrating display of the display device illustrated in FIG. 2 in a case in which there is a probability that an engine is activated.

At this time, the first pointing portion 42 and the first strip-shaped image 43 (first display portion 41) are displayed inside the first display region 31, and the first pointing portion 42 and the first strip-shaped image 43 shift within the range of the first display region 31 in accordance with a traveling output in the first mode, on the gauge panel 35 of the display device 30 (see FIGS. 2 and 3). Since the engine 12 is not activated, and the second pointing portion 52 does not deviate within the second display region 32 (pointing the scale mark "0"), the second strip-shaped image 53 is not displayed in the first mode.

Here, the first pointing portion 42 and the first strip-shaped image 43 are displayed for a predetermined output parameter or an arbitrary output parameter (a battery output of the battery 13, for example) selected with the selection switch, which is not illustrated, as the traveling output in the first mode that serves as the first variable.

Therefore, the driver can easily recognize that the hybrid vehicle 10 is traveling in the first mode (the traveling state of the hybrid vehicle 10) on the basis of the fact that the second pointing portion 52 has not deviated inside the second display region 32 and the second strip-shaped image 53 is not displayed in the gauge panel 35 of the display device 30.

Then, when the traveling output in the first mode is a traveling output that does not exceed the start point scale mark 45a, that is, a traveling output with no probability that the engine 12 is activated, the first pointing portion 42 and the first strip-shaped image 43 shift within the range of the region except for the third display region 33 in the first display region 31 in accordance with the traveling output in the first mode (see FIG. 2).

Therefore, the driver can easily recognize availability of the traveling in the first mode and can continue to travel in the first mode in relief on the basis of the first pointing portion 42 and the first strip-shaped image 43 in the first display region 31 (the fact that the first pointing portion 42 and the first strip-shaped image 43 shift within the range of the region except for the third display region 33 in the first display region 31).

On the other hand, if the traveling output in the first mode has become a traveling output exceeding the start point scale mark 45a, that is, a traveling output with a probability that the engine 12 is activated, then the first pointing portion 42 and the first strip-shaped image 43 shift within the range of the third display region 33 in the first display region 31 in accordance with the traveling output in the first mode until a timing immediately before the engine 12 is activated (see FIG. 3).

Therefore, the driver can operate the hybrid vehicle 10 while recognizing the positions of the first pointing portion 42 and the first strip-shaped image 43 inside the third display region 33, and in a case in which the driver does not desire to activate the engine 12, for example, the driver can perform an operation to return the first pointing portion 42 and the first strip-shaped image 43 to the inside of the range of the region except for the third display region 33 in the first display region 31 through an operation of an acceleration position or the like.

If the traveling output in the first mode exceeds a maximum output of the battery 13, for example, then the engine 12 is activated, and the hybrid vehicle 10 starts to travel in the second mode. For example, the hybrid vehicle 10 travels in the second mode at the time of power running to accelerate the hybrid vehicle 10.

Figure 4:
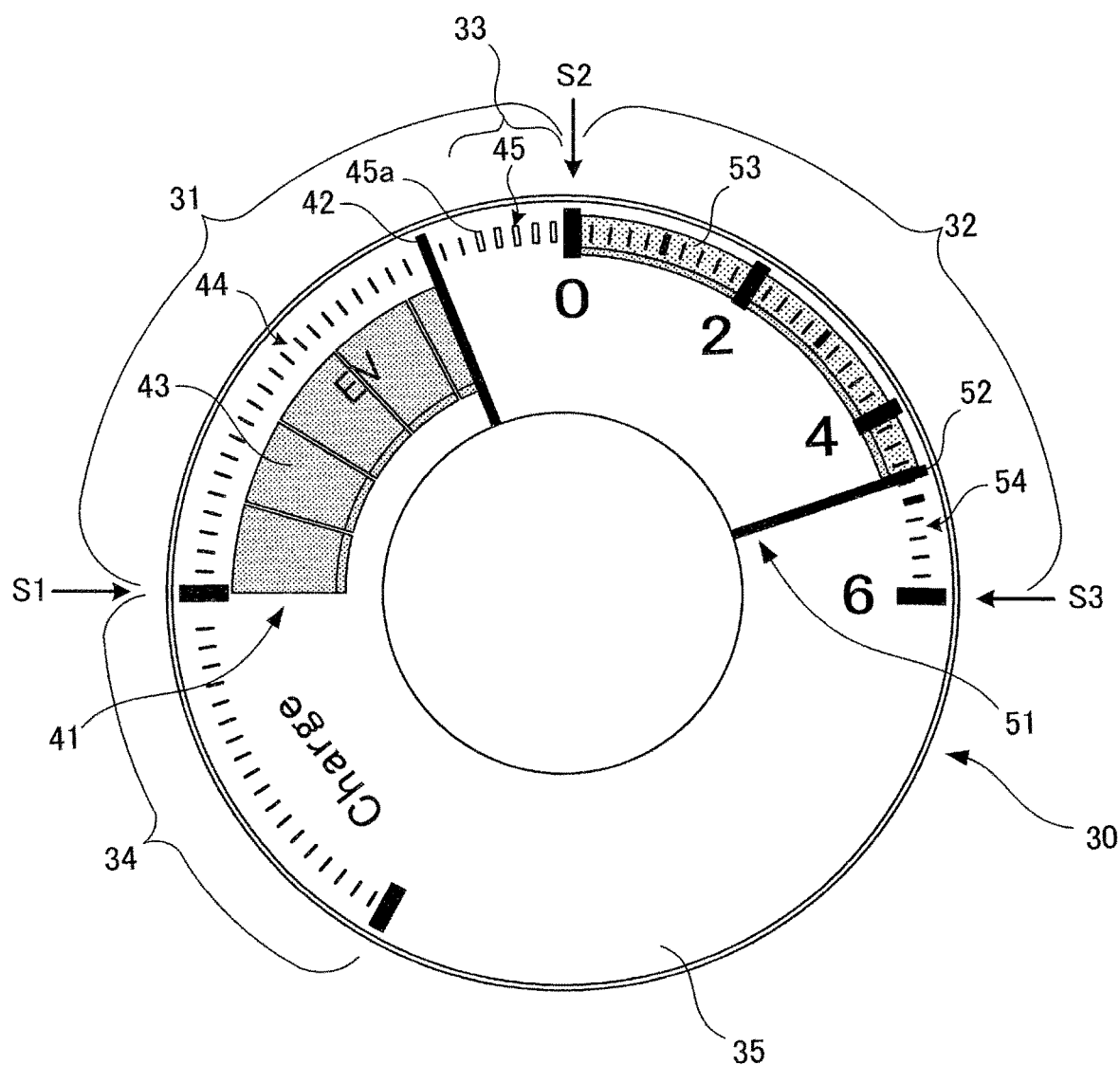
FIG. 4 is a diagram illustrating display of the display device illustrated in FIG. 2 in a second mode.

At this time, the second pointing portion 52 deviates from the scale mark "0" in the second display region 32, and the second strip-shaped image 53 is displayed on the gauge panel 35 of the display device 30, and the second pointing portion 52 and the second strip-shaped image 53 shift inside the range of the second display region 32 in accordance with the traveling output in the second mode (see FIG. 4).

Here, the second pointing portion 52 and the second strip-shaped image 53 are displayed for a predetermined output parameter or an arbitrary output parameter (an output of the engine 12, for example) selected with the selection switch, which is not illustrated, as the traveling output in the second mode that serves as the second variable, and the first pointing portion 42 and the first strip-shaped image 43 are displayed for the motor output in the second mode or an arbitrary output parameter (a rotation frequency of the motor 11, for example) selected with the selection switch, which is not illustrated.

Therefore, the driver can easily recognize that the hybrid vehicle 10 has shifted from the first mode to the second mode through dynamic motions of the second pointing portion 52 and the second strip-shaped image 53 when the traveling in the second mode is started on the gauge panel 35 of the display device 30, and the driver can easily recognize that the hybrid vehicle 10 is traveling in the second mode (the traveling state of the hybrid vehicle 10) on the basis of the fact that the second pointing portion 52 has deviated inside the second display region 32 (pointing a portion other than the scale mark "0") and the second strip-shaped image 53 is being displayed.

Incidentally, the motor 11 is configured to function as a regenerative brake in a case in which the hybrid vehicle 10 is to be decelerated during traveling in the second mode. In other words, the battery 13 is charged through power generation of the motor 11 at the time of regenerative brake during the regeneration in which the hybrid vehicle 10 is decelerated.

Figure 5:
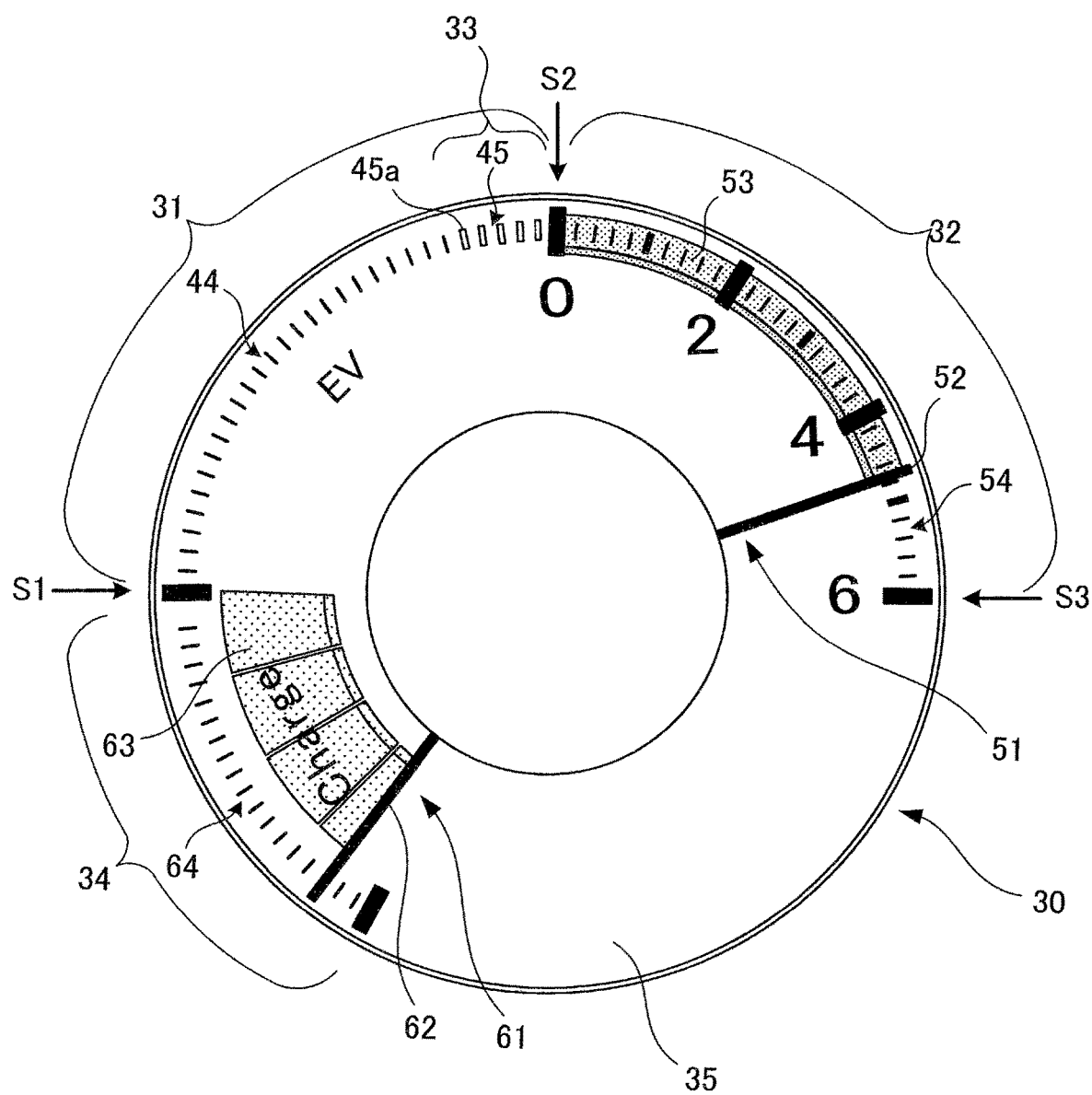
FIG. 5 is a diagram illustrating display of the display device illustrated in FIG. 2 at the time of regeneration.

At this time, the fourth pointing portion 62 and the fourth strip-shaped image 63 (fourth display portion 61) are displayed in the fourth display region 34 instead of the display of the first pointing portion 42 and the first strip-shaped image 43 in the first display region 31 disappearing, and the fourth pointing portion 62 and the fourth strip-shaped image 63 shift within the range of the fourth display region 34 in accordance with the charged power to the battery 13 at the time of the regeneration, on the gauge panel 35 of the display device 30 (see FIG. 5).

At this time, the second pointing portion 52 and the second strip-shaped image 53 shift within the range of the second display region 32 in accordance with the engine output in the second mode as described above with reference to FIG. 4.

Therefore, the driver can easily recognize that the hybrid vehicle 10 is traveling only the engine 12 activated in the second mode (the traveling state of the hybrid vehicle 10) on the basis of the fact that the first pointing portion 42 and the first strip-shaped image 43 are not being displayed in the first display region 31 and the second pointing portion 52 and the second strip-shaped image 53 are being displayed in the second display region 32 on the gauge panel 35 of the display device 30.

Also, the driver can easily recognize that the battery 13 is charged through charging of the motor 11 at the time of regenerative brake on the basis of the fact that the fourth pointing portion 62 and the fourth strip-shaped image 63 are being displayed in the fourth display region 34 and can recognize the charged power to the battery 13 (generated power output of the motor 11) at the time of regeneration from the display of the fourth pointing portion 62 and the fourth strip-shaped image 63 (the pointing direction of the fourth pointing portion 62 and the length of the fourth strip-shaped image 63 in the circumferential direction) in the fourth display region 34.

As described above, according to the display device 30, the first pointing portion 42 and the first strip-shaped image 43 that change in accordance with a traveling output in the first mode are displayed in the first display region 31 including the third display region 33, the second pointing portion 52 and the second strip-shaped image 53 that change in accordance with a traveling output in the second mode are displayed in the second display region 32, and the fourth pointing portion 62 and the fourth strip-shaped image 63 that change in accordance with the charged power are displayed in the fourth display region 34, and the driver can thus easily determine the traveling state of the hybrid vehicle 10 by recognizing these changes. Therefore, the driver can accurately recognize the traveling state of the hybrid vehicle 10 and can easily realize intended driving.

Although the embodiment of the display device has been described in the example of the hybrid vehicle in the present embodiment, the display device according to the present invention can also be applied to an engine vehicle. In that case, although it is not necessary to provide the third display region 33 and the fourth display region 34 described above, the first display region 31 and the second display region 32 are displayed as described above. In the case of the engine vehicle, the first variable to be displayed in the first display region 31 is, for example, a speed, and the second variable to be displayed in the second display region 32 is, for example, a rotation frequency of the engine, such that a plurality of items of information reflecting the state of the engine vehicle are displayed in an easily understandable way.

INDUSTRIAL APPLICABILITY

The present invention is suitable for a display device for a hybrid vehicle that has a motor and an engine. Also, the present invention can be applied as a display device for an engine vehicle that has only an engine.

EXPLANATION OF REFERENCE SIGNS

10 Hybrid vehicle
11 Motor
12 Engine
13 Battery
14 Vehicle speed sensor
15 Accelerator position sensor
20 ECU
30 Display device
31 First display region
32 Second display region
33 Third display region
34 Fourth display region
35 Gauge panel
41 First display portion
42 First pointing portion
43 First strip-shaped image
44 First scale mark
45 Third scale mark
51 Second display portion
52 Second pointing portion
53 Second strip-shaped image
54 Second scale mark
61 Fourth display portion
62 Fourth pointing portion
63 Fourth strip-shaped image
64 Fourth scale mark

The invention claimed is:

1. A display device that displays information of variables that reflect a state of a vehicle, the display device comprising:
a first display region that displays a scale of a first variable;
a second display region that is provided to be aligned with the first display region and displays a scale of a second variable;
a first pointing portion that points, in the first display region, the first variable in accordance with the state of the vehicle;
a first strip-shaped image that is displayed between a pointed position of the first pointing portion and a start point of the first display region;
a second pointing portion that points, in the second display region, the second variable in accordance with the state of the vehicle; and
a second strip-shaped image that is displayed between a pointed position of the second pointing portion and a start point of the second display region,
wherein the first variable indicates a first output of the vehicle in a first mode in which priority is placed on traveling using an electric motor with an internal combustion engine stopped, and
the second variable indicates a second output of the vehicle in a second mode in which the vehicle travels with the internal combustion engine operated,
wherein the thickness of the first strip-shaped image is thicker than the thickness of the second strip-shaped image.

2. The display device according to claim 1, wherein the first variable indicates a third output of the vehicle in the second mode, and the third output is different from the second output.

3. The display device according to claim 1, further comprising:
a third display region that is provided inside the first display region at a portion close to the second display region and indicates a range of the output in which there is a high probability that the internal combustion engine is activated.

4. The display device according to claim 3, wherein scale marks provided in the third display region and other scale marks provided in the first display region have different color combinations.

5. The display device according to claim 1, wherein scale mark numbers are represented in the second display region, and the second strip-shaped image is displayed at a position at which the second strip-shaped image does not overlap the scale mark numbers.

6. The display device according to claim 1, further comprising:
   a fourth display region that is provided to be aligned with the first display region on a side different from a side of the second display region and indicates a charged power in a battery of the vehicle at the time of regeneration;
   a fourth pointing portion that changes in accordance with the charged power in the fourth display region; and
   a fourth strip-shaped image that is displayed between a pointed position of the fourth pointing portion and a start point of the fourth display region,
   wherein the first strip-shaped image and the fourth strip-shaped image are displayed in different display forms.

7. The display device according to claim 6, wherein the first strip-shaped image and the fourth strip-shaped image have different color combinations.

8. The display device according to claim 1,
   wherein a region including the first display region and the second display region has a semi-circular shape, and
   the start point of the first display region is at a 9 o'clock position, and an end point of the second display region is at a 3 o'clock position.

\* \* \* \* \*